(12) United States Patent
Barth

(10) Patent No.: US 11,230,050 B2
(45) Date of Patent: Jan. 25, 2022

(54) LATTICE BASE STRUCTURES FOR ADDITIVE MANUFACTURING

(71) Applicant: Carbon, Inc., Redwood City, CA (US)

(72) Inventor: Florian Markus Barth, Los Gatos, CA (US)

(73) Assignee: Carbon, Inc., Redwood City, CA (US)

( * ) Notice: Subject to any disclaimer, the term of this patent is extended or adjusted under 35 U.S.C. 154(b) by 52 days.

(21) Appl. No.: 16/287,144

(22) Filed: Feb. 27, 2019

(65) Prior Publication Data

US 2019/0263070 A1    Aug. 29, 2019

Related U.S. Application Data

(60) Provisional application No. 62/635,822, filed on Feb. 27, 2018.

(51) Int. Cl.
*B29C 64/124* (2017.01)
*B29C 64/40* (2017.01)
(Continued)

(52) U.S. Cl.
CPC ........ *B29C 64/124* (2017.08); *A61C 13/0013* (2013.01); *B29C 64/40* (2017.08);
(Continued)

(58) Field of Classification Search
CPC ... B29C 64/124; B29C 64/129; B29C 64/135; B29C 64/40; B29C 64/35; A61C 13/0013; B33Y 40/00
See application file for complete search history.

(56) References Cited

U.S. PATENT DOCUMENTS

| 4,020,208 A | 4/1977 | Mercer et al. |
| 5,039,567 A | 8/1991 | Landi et al. |

(Continued)

FOREIGN PATENT DOCUMENTS

| IT | 274727 | 8/2015 |
| WO | 2001/72501 | 10/2001 |

(Continued)

OTHER PUBLICATIONS

Autodesk, How to use the Ember 3D Printer to create PFM dental crowns, YouTube Video, Jun. 17, 2016, https://www.youtube.com/watch?v=BsyilbcVUXw (Year: 2016).*

(Continued)

*Primary Examiner* — Joseph S Del Sole
*Assistant Examiner* — Jerzi H Moreno Hernandez
(74) *Attorney, Agent, or Firm* — Myers Bigel, P.A.

(57) ABSTRACT

A method of making at least one three-dimensional object by additive manufacturing, including: (a) producing, on a carrier platform, by bottom-up stereolithography from a single batch of polymerizable resin, a composite article comprising and produced in the sequence of: (i) an open lattice layer on the carrier platform; then (ii) a frangible layer on the lattice layer; and then (iii) at least one three-dimensional object on the frangible layer; then (b) cleaning the composite article with a wash liquid while on the carrier platform; (c) optionally separating the composite article from the carrier platform; and (d) optionally further curing the composite article; and then (e) separating the at least one three-dimensional object from the lattice layer by cutting or breaking the frangible layer.

11 Claims, 5 Drawing Sheets

(51) Int. Cl.
  *A61C 13/00*    (2006.01)
  *B29C 64/35*    (2017.01)
  *B33Y 10/00*    (2015.01)
  *B33Y 80/00*    (2015.01)
  *A61C 13/34*    (2006.01)
  *B33Y 40/00*    (2020.01)
  *B29L 31/00*    (2006.01)

(52) U.S. Cl.
  CPC .............. *A61C 13/34* (2013.01); *B29C 64/35* (2017.08); *B29L 2031/7536* (2013.01); *B33Y 10/00* (2014.12); *B33Y 40/00* (2014.12); *B33Y 80/00* (2014.12)

(56) References Cited

U.S. PATENT DOCUMENTS

| | | | |
|---|---|---|---|
| 5,122,441 A | | 6/1992 | Lawton et al. |
| 5,236,637 A | | 8/1993 | Hull |
| 5,248,456 A | * | 9/1993 | Evans, Jr. ............... B29C 64/35 |
| | | | 264/401 |
| 5,391,072 A | | 2/1995 | Lawton et al. |
| 5,595,703 A | * | 1/1997 | Swaelens ................ B29C 64/40 |
| | | | 264/401 |
| 5,879,780 A | | 3/1999 | Kindinger et al. |
| 5,897,825 A | * | 4/1999 | Fruth ..................... B33Y 10/00 |
| | | | 264/401 |
| 6,558,606 B1 | * | 5/2003 | Kulkarni ................ B33Y 10/00 |
| | | | 264/401 |
| 7,328,077 B2 | | 2/2008 | Durbin et al. |
| 7,424,967 B2 | | 9/2008 | Ervin et al. |
| 7,438,846 B2 | | 10/2008 | John |
| 7,481,647 B2 | | 1/2009 | Sambu et al. |
| 7,678,440 B1 | | 3/2010 | McKnight et al. |
| 7,709,544 B2 | | 5/2010 | Doyle et al. |
| 7,845,930 B2 | | 12/2010 | Shkolnik et al. |
| 7,892,474 B2 | | 2/2011 | Shkolnik et al. |
| 8,110,135 B2 | | 2/2012 | El-Siblani |
| 8,738,340 B2 | | 5/2014 | Dunne et al. |
| 9,116,428 B1 | | 8/2015 | Jacobsen et al. |
| 9,205,601 B2 | | 12/2015 | Desimone et al. |
| 9,211,678 B2 | | 12/2015 | Desimone et al. |
| 9,216,546 B2 | | 12/2015 | Desimone et al. |
| 9,360,757 B2 | | 6/2016 | Desimone et al. |
| 9,375,298 B2 | | 6/2016 | Boronkay et al. |
| 9,498,920 B2 | | 11/2016 | Desimone et al. |
| 9,921,037 B2 | | 3/2018 | Wadley et al. |
| 9,993,974 B2 | | 6/2018 | Desimone et al. |
| 10,016,938 B2 | | 7/2018 | Desimone et al. |
| 10,093,064 B2 | | 10/2018 | Desimone et al. |
| 10,144,181 B2 | | 12/2018 | Desimone et al. |
| 10,150,253 B2 | | 12/2018 | Desimone et al. |
| 10,384,394 B2 | | 8/2019 | McCluskey |
| 10,596,755 B2 | | 3/2020 | Desimone et al. |
| 10,618,215 B2 | | 4/2020 | Desimone et al. |
| 2006/0080835 A1 | | 4/2006 | Kooistra et al. |
| 2009/0130449 A1 | * | 5/2009 | El-Siblani .............. B33Y 10/00 |
| | | | 428/409 |
| 2010/0228369 A1 | * | 9/2010 | Eggers ................... B33Y 50/00 |
| | | | 700/98 |
| 2011/0089610 A1 | | 4/2011 | El-Siblani et al. |
| 2011/0283873 A1 | | 11/2011 | Wadley et al. |
| 2013/0052396 A1 | | 2/2013 | Dean et al. |
| 2013/0143060 A1 | | 6/2013 | Jacobsen et al. |
| 2013/0292862 A1 | | 11/2013 | Joyce |
| 2013/0295212 A1 | * | 11/2013 | Chen ..................... B29C 64/129 |
| | | | 425/150 |
| 2014/0300017 A1 | * | 10/2014 | Wighton ............... B29C 64/141 |
| | | | 264/40.1 |
| 2015/0145171 A1 | * | 5/2015 | Walker .................... B29C 64/40 |
| | | | 264/401 |
| 2015/0331402 A1 | | 11/2015 | Lin et al. |
| 2015/0360419 A1 | | 12/2015 | Willis et al. |
| 2016/0193786 A1 | * | 7/2016 | Moore ................... B29C 64/393 |
| | | | 425/162 |
| 2016/0200052 A1 | * | 7/2016 | Moore ................... B29C 64/245 |
| | | | 264/401 |
| 2016/0361889 A1 | | 12/2016 | Bartolome |
| 2017/0129167 A1 | | 5/2017 | Castanon |
| 2017/0129169 A1 | | 5/2017 | Batchelder et al. |
| 2018/0095448 A1 | | 4/2018 | Vernon |
| 2018/0264718 A1 | | 9/2018 | McCluskey |
| 2018/0281287 A1 | * | 10/2018 | Tanner ................... B33Y 50/02 |
| 2018/0304541 A1 | | 10/2018 | Barth |
| 2019/0039213 A1 | | 2/2019 | Merlo et al. |
| 2019/0126547 A1 | | 5/2019 | Desimone et al. |
| 2019/0152163 A1 | * | 5/2019 | Amaya ................. B29C 64/135 |
| 2019/0291347 A1 | | 9/2019 | Price et al. |
| 2019/0389127 A1 | | 12/2019 | Desimone et al. |
| 2020/0139617 A1 | | 5/2020 | Desimone et al. |

FOREIGN PATENT DOCUMENTS

| | | |
|---|---|---|
| WO | 2011/086450 | 7/2011 |
| WO | 2018/182974 | 10/2018 |

OTHER PUBLICATIONS

The 3D dentist, Removing Supports from Laser SLA Prints, YouTube Video, Apr. 1, 2017, https://www.youtube.com/watch?v=66Sdjuz14X4 (Year: 2017).*

Dendukuri et al., Continuous-flow lithography for high-throughput microparticle synthesis, Nature Materials, 5:365-369, May 2006, published online on Apr. 9, 2006 by Nature Publishing Group, UK.

Dendukuri et al., Modeling of Oxygen-Inhibited Free Radical Photopolymerization in a PDMS Microfluidic Device, Macromolecules, 2008, 41 (22), 8547-8556, published on Oct. 21, 2008, by American Chemical Society, US.

Dendukuri et al., Stop-flow lithography in a microfluidic device, Lab Chip, 2007, 7, 818-828, first published as an Advance Article on the web on May 21, 2007, by the Royal Society of Chemistry, UK.

Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.

Pan Y et al. A fast mask projection stereolithography process for fabricating digital models in minutes. Journal of Manufacturing Science and Engineering. Oct. 2012; 134: 9 pp.

Stern, S.A. "The 'Barrer' Permeability Unit" pp. 1933-1934 (1968) Journal of Polymer Science, Part A-2, vol. 6.

Tumbleston Jr et al. "Continuous liquid interface production of 3D Objects" Science 347(6228):1349-1352 (Mar. 20, 2015).

Yasuda H. "Permeability of Polymer Membranes to Dissolved Oxygen", Journal of Polymer Science, vol. 4, p. 1314-1316 (1966).

\* cited by examiner

LATTICE BASE STRUCTURES FOR ADDITIVE MANUFACTURING

RELATED APPLICATIONS

This application claims priority from U.S. Provisional Application No. 62/635,822, filed Feb. 27, 2018, the disclosure of which is hereby incorporated herein in its entirety.

FIELD OF THE INVENTION

The present invention concerns additive manufacturing, and particularly concerns systems for additive manufacturing in which residual resin is more rapidly washed from additively manufactured objects.

BACKGROUND OF THE INVENTION

Dental models and dies are used to prepare prosthetic crowns for patients, typically in labs where the crowns are manufactured, and then tested and modified by dental artisans as required, before they are sent to the dentist for fitting onto a previously prepared tooth of a patient (See, e.g., U.S. Pat. No. 7,328,077). Because humans are so sensitive to even slight mis-alignments between their teeth, a high level of accuracy for such models is required (See, e.g., U.S. Pat. No. 8,738,340). In addition, dental models are utilized as forms for producing polymeric dental aligners, again with a high level of accuracy required.

Currently, the most accurate dental models and dies are milled from larger blocks of materials on five-axis milling machines. While accurate, such machines are expensive, and can be slow. And, speed of manufacture is important, because temporary crowns can be fragile, and a patient's teeth can shift surprisingly quickly if the permanent crown is not promptly installed (potentially requiring the manufacture of an entirely new crown).

Additive manufacturing techniques would seem ideally suited to the production of dental models and dies. Unfortunately, the more accurate techniques, such as jet-printing methods, can be extremely slow (for example, requiring approximately five hours to produce the model), and can generate objects with poor material and handling properties. The more rapid techniques (such as stereolithography), on the other hand, can sometimes produce models and dies with less accuracy than desired (see, e.g., U.S. Pat. No. 9,375,298 to Boronkay et al.; U.S. Pat. No. 7,481,647 to Sambu et al.). Further, such techniques are generally carried out by photopolymerizing a viscous resin, which resin can apply suction forces to the growing objects as they are produced, and with few techniques available for rapidly or conveniently washing the viscous resin from the objects after they have been produced.

Accordingly, there is a need for new techniques for rapidly producing and washing objects, particularly where reasonable or high levels of accuracy of such objects is required.

SUMMARY OF THE INVENTION

A first aspect of the present invention is a method of making at least one three-dimensional object by additive manufacturing, comprising:
(a) producing, on a carrier platform (e.g., on a substantially flat planar surface of a carrier platform), by bottom-up stereolithography from a single batch of polymerizable resin, a composite article comprising (and produced in the sequence of): (i) an open lattice layer on the carrier platform; then (ii) a frangible layer on the lattice layer; and then (iii) at least one three-dimensional object on the frangible layer; then
(b) cleaning the composite article with a wash liquid, optionally but preferably, while still on the carrier platform;
(c) optionally separating the composite article from the carrier platform; and
(d) optionally further curing the composite article (e.g., by heating or microwave irradiating); and then
(e) separating the at least one three-dimensional object from the lattice layer by cutting or breaking the frangible layer.

In some embodiments, the stereolithography includes (i) providing an optically transparent (that is, light transmissive) build surface on which the polymerizable resin is carried; and (ii) maintaining liquid contact between the polymerizable resin and the composite article during the producing step. In particular embodiments, the stereolithography is carried out by continuous liquid interface production (CLIP).

In particular embodiments, the optionally separating step (c) is included; and/or the optionally further curing step (d) is included.

A second aspect of the present invention is a composite article, comprising:
(a) a stereolithography apparatus carrier platform, and
(b) an article produced on the carrier platform (e.g., on a flat planar surface of the carrier platform) by the process of bottom-up stereolithography from a single batch of polymerizable resin, the composite article comprising, and produced in the following sequence: (i) an open lattice layer on the carrier platform; then (ii) a frangible layer on the lattice layer; and then (iii) at least one three-dimensional object on the frangible layer.

In particular embodiments of the forgoing, the at least one three-dimensional object comprises a dental model. However, while the present invention is primarily illustrated with application to dental models, it will be appreciated that it can be applied to any of a variety of useful three-dimensional objects that are produced by additive manufacturing, as discussed further below.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
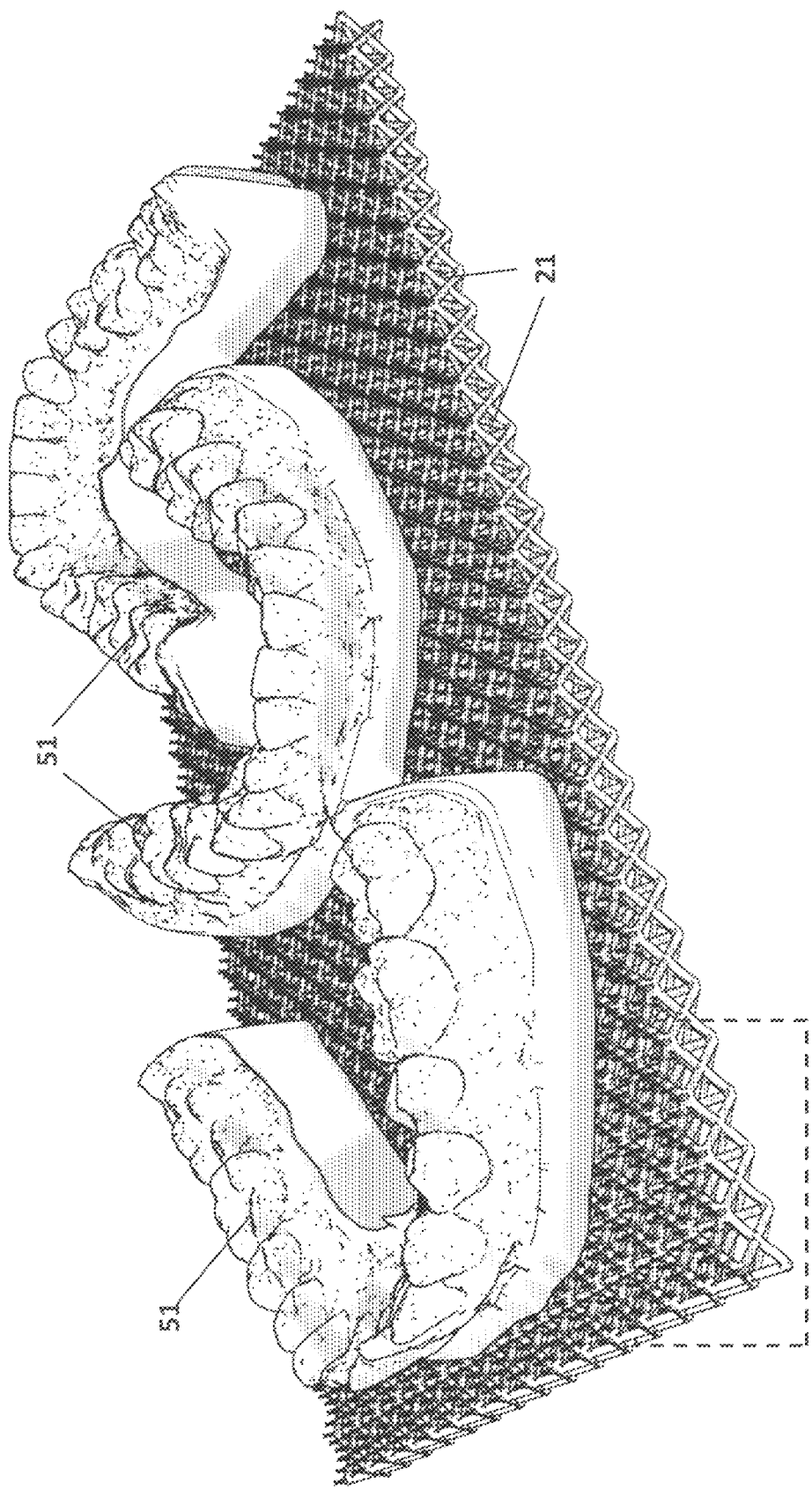
FIG. 1 is a perspective view of a plurality of three dimensional objects (in this case, dental models) on a lattice base structure, with the stereolithography carrier platform not shown

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Additive Manufacturing Methods and Apparatus.

Additive manufacturing of objects is preferably carried out with polymerizable resins by additive manufacturing, particularly stereolithography, and preferably bottom-up stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Pat. No. 9,636,873 to Joyce, and U.S. Pat. No. 9,120,270 to Chen et al. Such techniques typically involve projecting light through a window above which a pool of resin (or polymerizable liquid) is carried. A general purpose or functional part carrier is typically positioned above the window and above the pool, on which the growing object is produced.

In some embodiments of the present invention, the object is formed by continuous liquid interface production (CLIP). CLIP is known and described in, for example, PCT Applications Nos. PCT/US2014/015486 (also published as U.S. Pat. No. 9,211,678 on Dec. 15, 2015), PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out continuous liquid interface production (CLIP) include, but are not limited to: Batchelder et al., Continuous liquid interface production system with viscosity pump, US Patent Application Publication No. US 2017/0129169 (May 11, 2017); Sun and Lichkus, Three-dimensional fabricating system for rapidly producing objects, US Patent Application Publication No. US 2016/0288376 (Oct. 6, 2016); Willis et al., 3d print adhesion reduction during cure process, US Patent Application Publication No. US 2015/0360419 (Dec. 17, 2015); and Lin et al., Intelligent 3d printing through optimization of 3d print parameters, US Patent Application Publication No. US 2015/0331402 (Nov.

19, 2015). Other examples of methods and apparatus for carrying out particular embodiments of CLIP, or of additive manufacturing, include but are not limited to those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018).

In general, bottom-up three-dimensional fabrication is carried out by:

(a) providing a carrier and an optically transparent member having a build surface, the carrier and the build surface defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form.

In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In some embodiments, the additive manufacturing apparatus can be a Carbon, Inc. M1 or M2 apparatus implementing continuous liquid interface production, available from Carbon, Inc., 1089 Mills Way, Redwood City, Calif. 94063 USA.

2. Resins.

Resins, or photopolymerizable liquids, used in carrying out the methods of the invention, can be conventional resins, or dual cure resins (that is, resins requiring further cure following additive manufacturing, such as a baking step). Numerous suitable resins are known and include, but are not limited to those described in the references above. In some embodiments, dual cure resins such as those described in U.S. Pat. Nos. 9,453,142 and/or 9,598,606 to Rolland et al., can be used.

In some embodiments, the resin is one which, when polymerized to produce the model and die, produces a model and die comprised of poly(acrylate), poly(methacrylate), poly(urethane acrylate), poly(urethane methacrylate), poly (epoxy acrylate), or poly(epoxy methacrylate).

In some embodiments, the resin is one which, when polymerized to produce the model and die, produces a model and die comprising or consisting of a polymer having: a tensile modulus of 1200 or 1600 MPa to 3000 MPa, or more; an elongation at break of 2% to 100 or 140%, or more; a flexural strength of 40 or 60 MPa, to 100 or 120 MPa, or more; and/or a flexural modulus (chord, 0.5%-1% strain) of 1500 or 2000 MPa, to 3000 MPa, or more.

Particular examples of suitable resins include, but are not limited to, Carbon, Inc., UMA resins (particularly PR25 resin in the UMA resin family), as well as Carbon, Inc. RPU and EPX dual cure resins, available from Carbon, Inc., 1089 Mills Way, Redwood City, Calif. 94063 USA.

3. Post-Production Steps.

As noted above, aspects of the invention involve washing the object, and then (depending on the choice of resin) further curing the object.

Washing.

After the intermediate object is formed, it is optionally washed (e.g., with an organic solvent), optionally dried (e.g., air dried) and/or rinsed (in any sequence).

Solvents (or "wash liquids") that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected based, in part, on their environmental and health impact (see, e.g., GSK Solvent Selection Guide 2009). Additional examples include hydrofluorocarbon solvents (e.g., 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.); hydrochlorofluorocarbon solvents (e.g., 3,3-Dichloro-1,1,1,2,2-pentafluoropropane, 1,3-Dichloro-1,1,2,2,3-pentafluoropropane, 1,1-Dichloro-1-fluoroethane, etc.); hydrofluorether solvents (e.g., methyl nonafluorobutyl ether (HFE-7100), methyl nonafluoroisobutyl ether (HFE-7100), ethyl nonafluorobutyl ether (HFE-7200), ethyl nonafluoroisobutyl ether (HFE-7200), 1,1,2,2-tetrafluoroethyl-2,2,2-trifluoroethyl ether, etc.); volatile methylsiloxane solvents (e.g., hexamethyldisiloxane (OS-10, Dow Corning), octamethyltrisiloxane (OS-20, Dow Corning), decamethyltetrasiloxane (OS-30, Dow Corning), etc.), including mixtures thereof.

Any suitable cleaning apparatus may be used, including but not limited to those described in U.S. Pat. Nos. 5,248,456; 5,482,659, 6,660,208; 6,996,245; and 8,529,703.

A preferred wash apparatus is a Carbon, Inc. smart part washer, available from Carbon, Inc., 1089 Mills Way, Redwood City, Calif. 94063 USA. Thus in some embodiments, the wash step, when included, may be carried out by immersing the object in a wash liquid such as described above, with agitation (e.g., by rotating the article in the wash liquid), optionally but preferably with the wash step carried out in a total time of 10 minutes or less.

Further Curing.

Further (or second) curing may be carried out by any suitable technique, including but not limited to those described in U.S. Pat. No. 9,453,142. In a preferred embodiment, the further curing is carried out by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the object at ambient temperature for a sufficient time to effect further cure—is in some embodiments preferred. Ovens may be batch or continuous (conveyor) ovens, as are known in the art.

Conveyor ovens are in some embodiments preferred, including multi-zone conveyor ovens and multi-heat source conveyor ovens, and associated carriers for objects that can serve to provide more uniform or regular heat to the object being cured. The design of conveyor heating ovens, and associated controls, are well known in the art. See, e.g., U.S. Pat. Nos. 4,951,648; 5,179,265; 5,197,375; and 6,799,712.

In some embodiments, the heating step is carried out using at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature). In some embodiments, the heating step is carried out using at least a first (oven) temperature and a second (oven) temperature, with the first temperature greater than ambient temperature, the second temperature greater than the first temperature, and the second temperature less than 250° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075.)

4. Lattice Base Structures and Use.

As illustrated in FIGS. 1-6C, the present invention provides a stereolithography apparatus carrier platform 11 having a composite article formed thereon, the article produced on the carrier platform (e.g., on a flat planar surface 12 of the carrier platform) by the process of bottom-up stereolithography (as described above) from a single batch of polymerizable resin. The composite article is comprised (and formed in the sequence of) a base member 21 comprised of an open lattice layer 31 on the carrier platform and a frangible layer 41 on the lattice layer, and at least one three-dimensional object 51 is formed on the frangible layer.

In the non-limiting illustrative embodiment, the object 51 is a dental model, such as comprising at least a portion of a dental arch of a human subject. Such models are useful for for forming polymer dental aligners, in dental labs for modeling crowns, implants, and the like, etc. As noted above, the present invention may be implemented with other objects as well, including but not limited to containers and housings for electronic devices and other consumer goods, ducts and vents (e.g., for automotive applications), connectors, models, etc.

As illustrated, the open lattice layer 31 is comprised of a regular open lattice of interconnected struts 32. Any of a variety of such regular open lattices can be employed, and irregular lattices (or "open cell foams") can be used as well.

The frangible layer 41 may be comprised of a plurality of optionally interconnected posts 42, beams, struts, or combination thereof (including in the form of a lattice), all with open spaces or voids provided that are in fluid communication with the open spaces of the lattice layer. In general, the frangible layer will have a tear strength less than that of the lattice layer.

In some embodiments, the frangible layer is asymmetrically formed and configured to break adjacent the at least one three-dimensional object during the separating step (e.g., so that a major portion of the frangible layer remains connected to the lattice layer following the separating step).

In the illustrated embodiment, the frangible layer is comprised of posts 42, which posts comprise a first end portion 46 and second end portion 48, with the first end portion connected to the lattice layer and the second end portion connected to the at least one three-dimensional object where present, and with the second end portion having an average diameter or cross-sectional area less than the first end portion, so that the frangible layer tears or breaks closer to the object than to the lattice layer.

Figure 2:
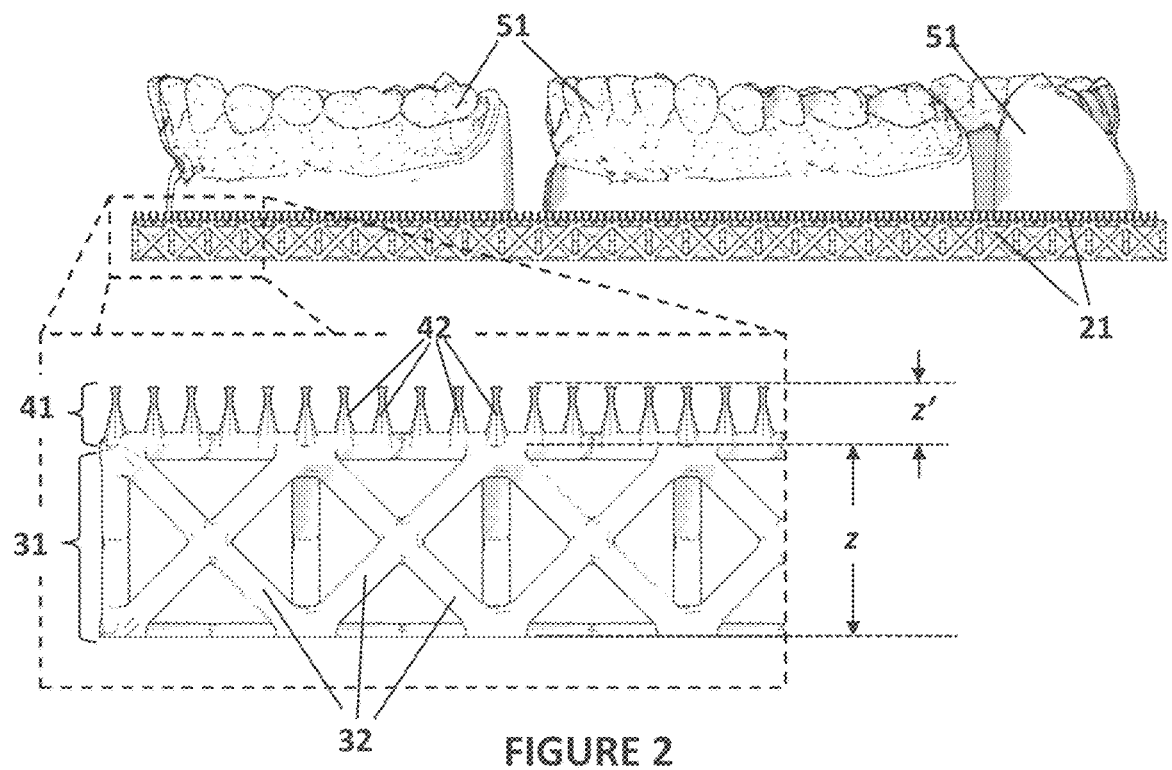
FIG. 2 is a side-sectional view of the embodiment of FIG. 1, with the carrier platform not shown.
Figure 3:
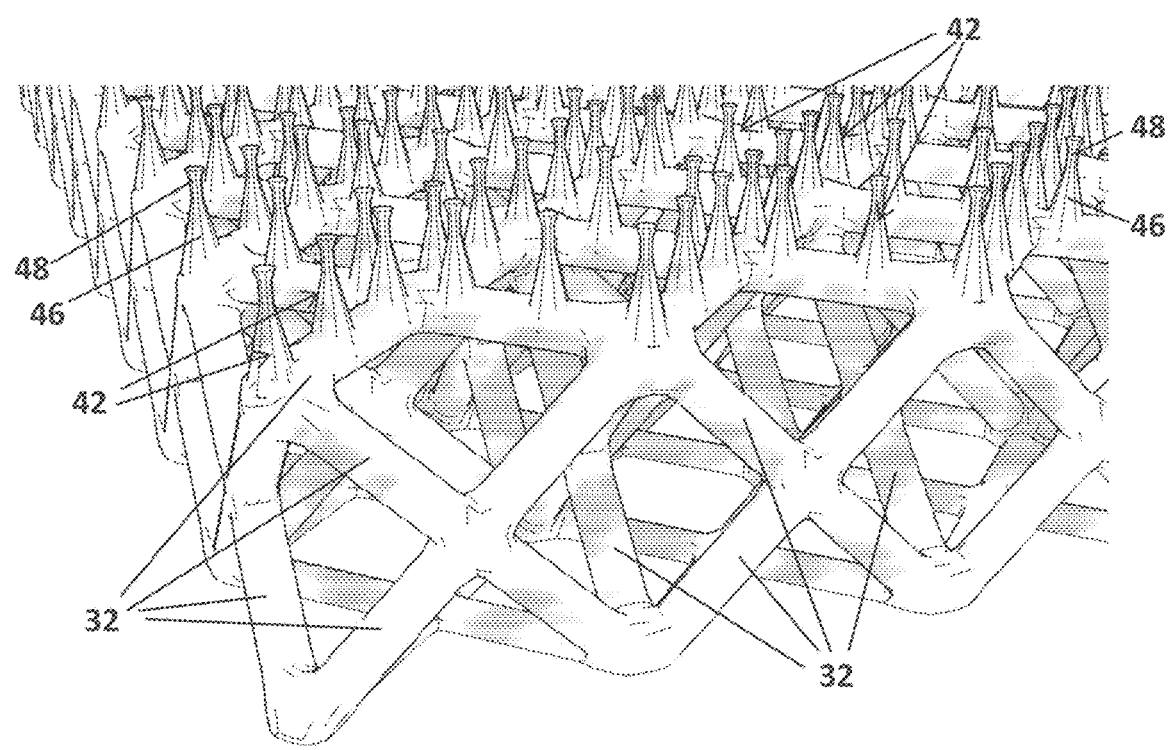
FIG. 3 is an enlarged view of the portion of FIG. 1 enclosed within the dashed box.
Figure 4:
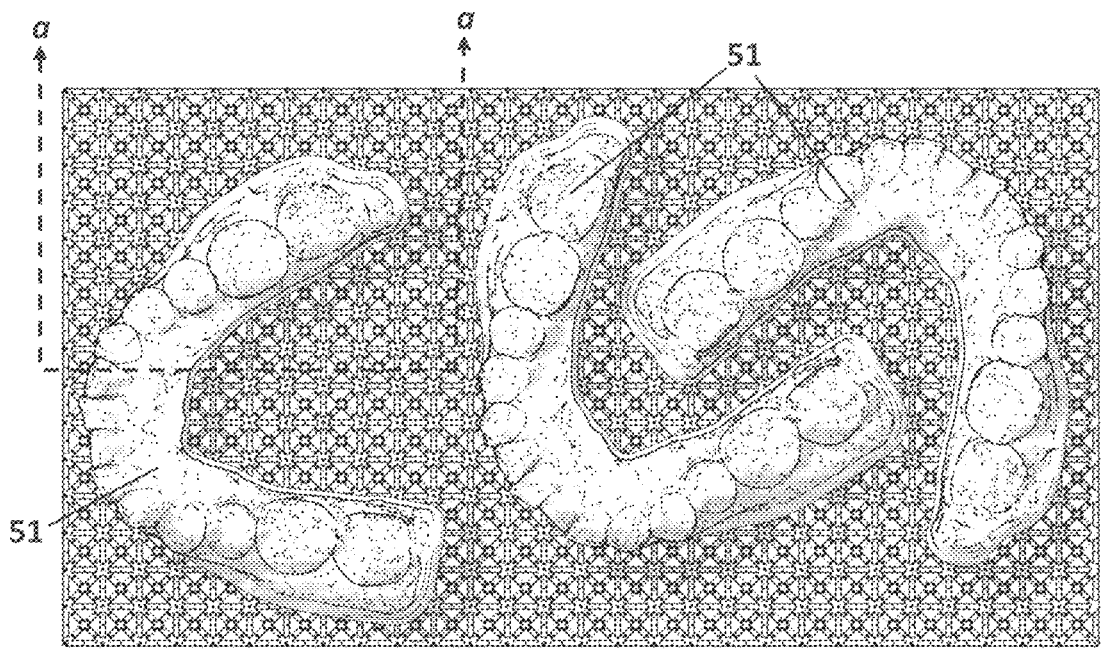
FIG. 4 is a top plan view of the embodiment of FIG. 1.
Figure 5:
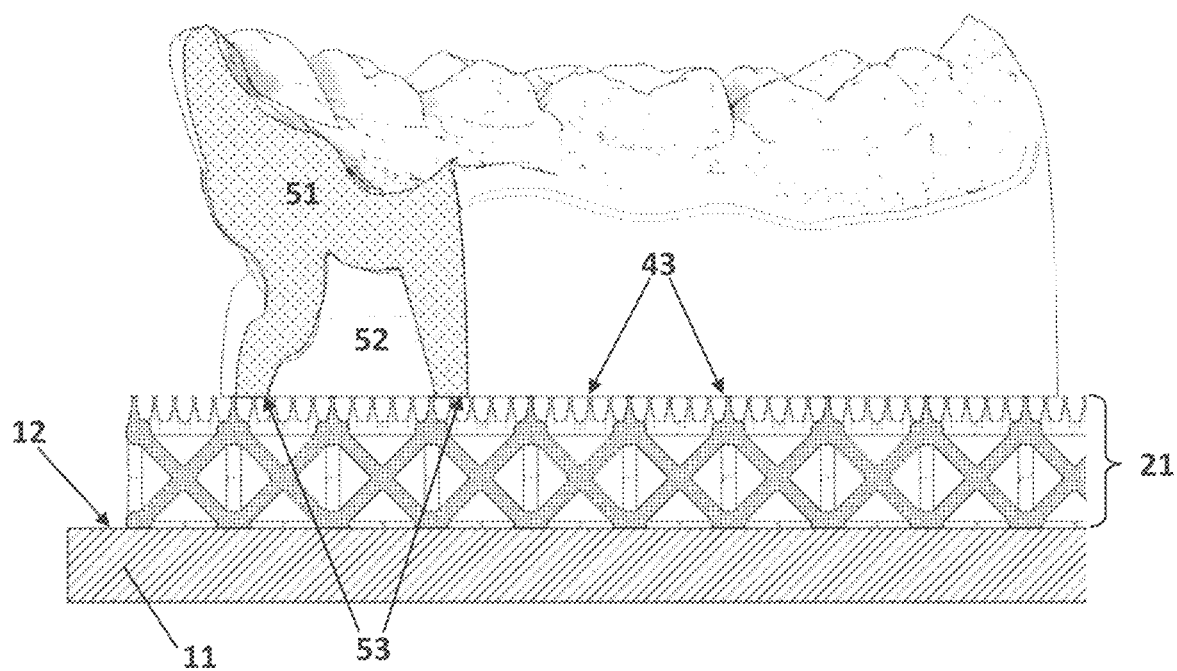
FIG. 5 is a side sectional view of that portion of the embodiment of FIG. 4 cut across line α-α therein.

As best seen in FIGS. 2 and 5, the frangible layer 41 has a substantially flat planar top surface portion 43, to which a substantially flat planar bottom surface portion 53 of the three-dimension object is connected.

As best seen in FIG. 2, the frangible layer 41 has a thickness z' less than the thickness z of the lattice layer 31 (and in preferred embodiments, a thickness less than half that of the lattice layer).

Figure 6A:
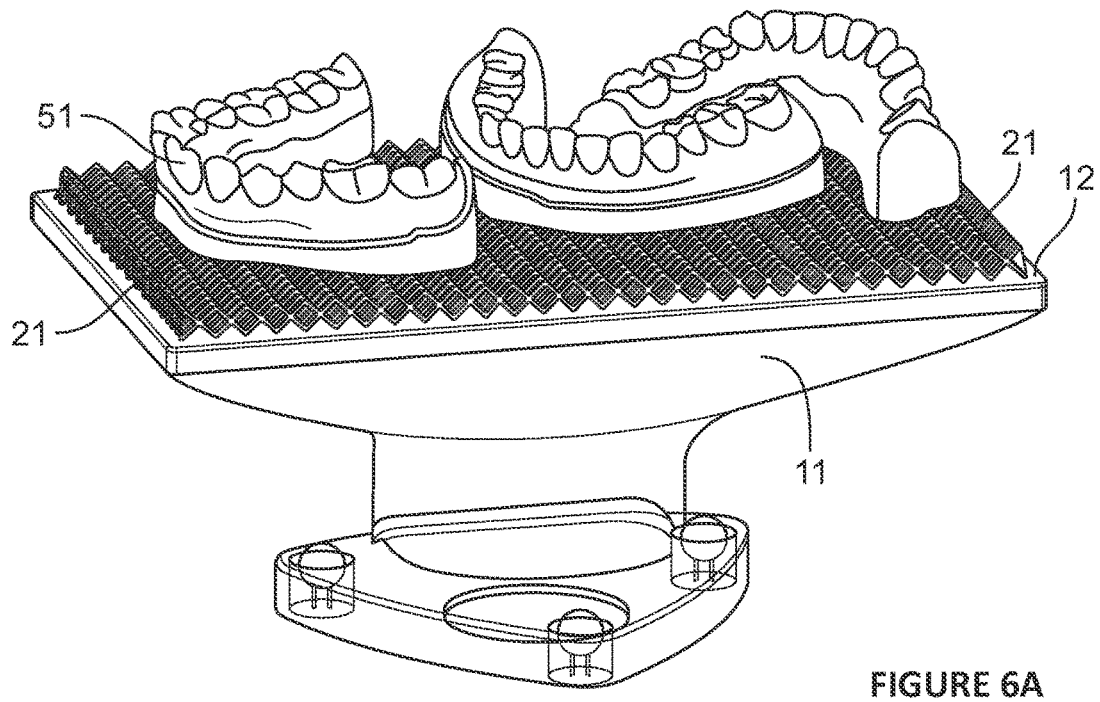
FIG. 6A is a virtual image of the embodiment of FIGS. 1-5, as to be produced on the carrier platform of a bottom-up additive manufacturing apparatus.
Figure 6B:
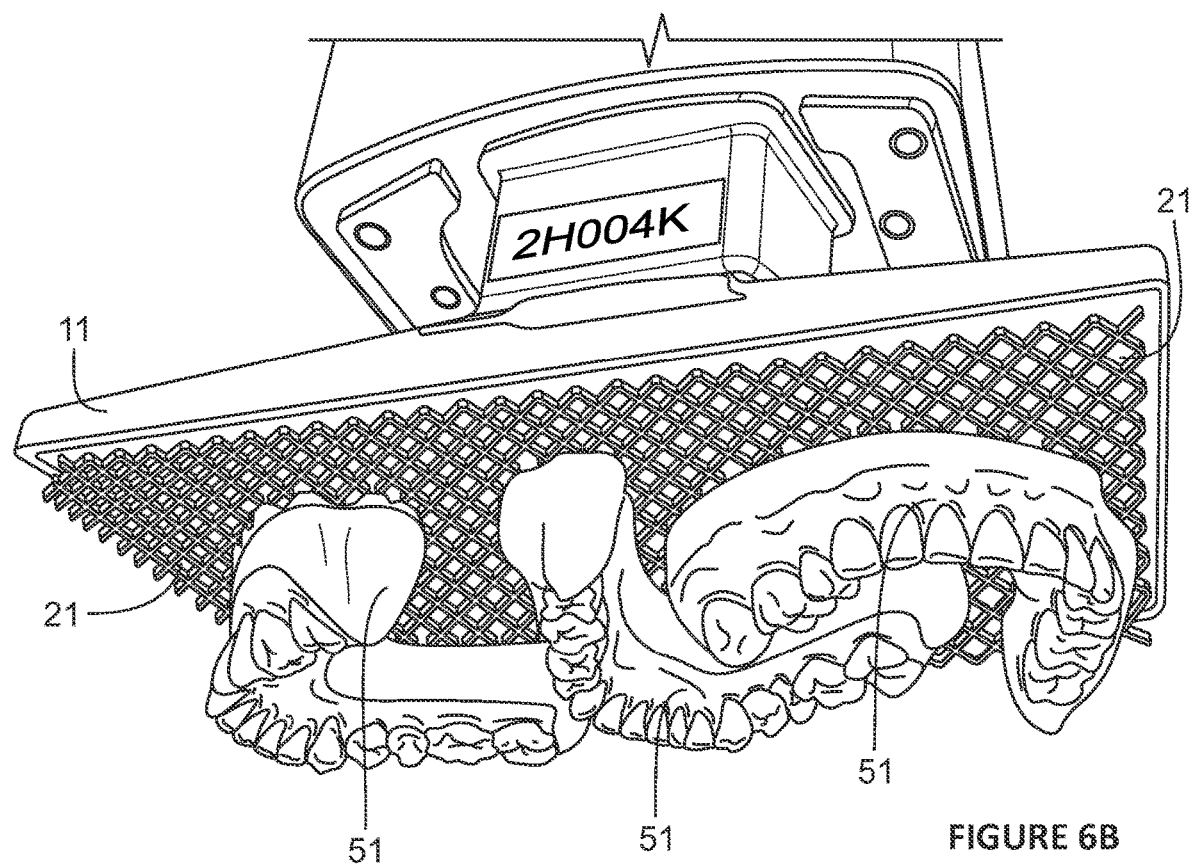
FIG. 6B is a photograph of the embodiment of FIG. 6A, as actually produced on the carrier platform of a bottom-up additive manufacturing apparatus.
Figure 6C:
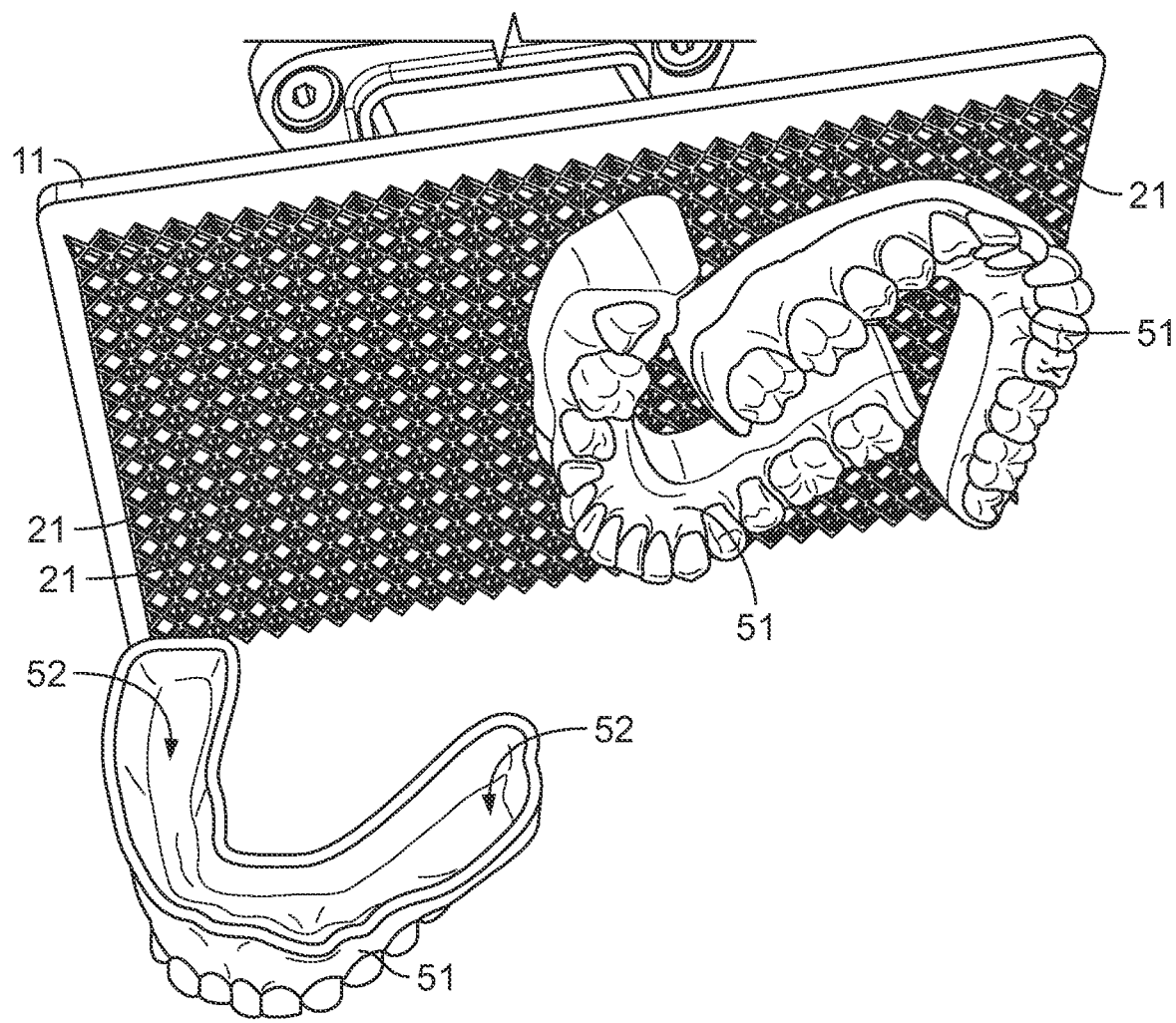
FIG. 6C is a photograph of the embodiment of FIG. 6B, after the objects have been washed, and with one of the objects (shown bottom-up) separated by breaking or cutting of the frangible layer between it and the lattice layer.

As best seen in FIG. 5 and FIG. 6C, the open lattice layer and the frangible layer have or define an open space, the three-dimensional object has an internal cavity 52, and the internal cavity is in fluid communication with the open space. These features serve to reduce suction forces applied to the growing object by the viscous polymerizable resin during production thereof (particularly by techniques such as CLIP), and also facilitate the flow of wash liquid into the internal cavity during washing thereof, particularly where the washing step is carried out with the object still affixed to the carrier plate 11.

A method of the present invention is illustrated by FIGS. 6A, 6B, and 6C. The method is carried out by producing, on a carrier platform (e.g., on a substantially flat planar surface of a carrier platform), by bottom-up stereolithography from a single batch of polymerizable resin, a composite article comprising (and produced in the sequence of): (i) an open lattice layer on the carrier platform; then (ii) a frangible layer on the lattice layer; and then (iii) at least one three-dimensional object on the frangible layer. The object(s) are then typically cleaned, most commonly by washing as described above, and preferably with the objects still remaining on the carrier platform. If dual cure resins are employed, the objects are then typically further cured, for example by baking. The objects can be separated from the lattice base by cutting, tearing, or breaking the frangible layer, before or after baking, though the lattice base can in some embodiments be utilized to enhance support and provide more uniform heating of the objects during the baking step.

The foregoing is illustrative of the present invention, and is not to be construed as limiting thereof. The invention is defined by the following claims, with equivalents of the claims to be included therein.

I claim:

1. A method of making at least one three-dimensional object by additive manufacturing, comprising:
(a) producing, on a flat planar surface of a carrier platform, by bottom-up stereolithography from a single batch of polymerizable resin, a composite article comprising and produced in the sequence of:
  (i) an open lattice layer on the carrier platform; then
  (ii) a frangible layer on said open lattice layer; and then
  (iii) the at least one three-dimensional object on said frangible layer; then
(b) cleaning said composite article with a wash liquid while on said carrier platform;
(c) optionally separating said composite article from said carrier platform; and
(d) optionally further curing said composite article; and then
(e) separating said at least one three-dimensional object from said open lattice layer by cutting or breaking said frangible layer,
wherein said frangible layer comprises a plurality of interconnected posts, beams, struts, or combination thereof,
wherein said open lattice layer and said frangible layer have an open space, said frangible layer has a substantially flat top surface portion, said at least one three-dimensional object has a substantially flat bottom surface portion connected to said substantially flat top surface portion, said at least one three-dimensional object has an internal cavity surrounded by said substantially flat bottom surface portion, and said internal cavity is in fluid communication with said open space, and
wherein said posts are interconnected by struts of said open lattice layer.

2. The method of claim 1, wherein said open lattice layer and said frangible layer are configured to facilitate the flow of said polymerizable resin therethrough and to said at least one three-dimensional object during said producing step.

3. The method of claim 1, wherein said open lattice layer and said frangible layer are configured to facilitate the flow of said wash liquid therethrough and to said at least one three-dimensional object during said cleaning step.

4. The method of claim 1, wherein said frangible layer is asymmetrically formed and configured to break adjacent said at least one three-dimensional object during said separating step so that a major portion of said frangible layer remains connected to said open lattice layer following said separating step.

5. The method of claim 1, wherein said posts comprise a first end portion and second end portion, with said first end portion connected to said open lattice layer and said second end portion connected to said at least one three-dimensional object where present, and with said second end portion having an average diameter less than said first end portion.

6. The method of claim 1, wherein said stereolithography includes:
(i) providing an optically transparent build surface on which said polymerizable resin is carried; and
(ii) maintaining liquid contact between said polymerizable resin and said composite article during said producing step.

7. The method of claim 1, wherein said stereolithography comprises continuous liquid interface production (CLIP).

8. The method of claim 1, wherein: said optionally separating step (c) is included; and/or said optionally further curing step (d) is included.

9. The method of claim 1, wherein said frangible layer has a substantially flat planar surface portion, said at least one three-dimension object connected to said surface portion.

10. The method of claim 1, wherein said frangible layer has a thickness less than that of said open lattice layer.

11. The method of claim 1, wherein said at least one three-dimensional object comprises a dental model.

* * * * *